Figure 1:
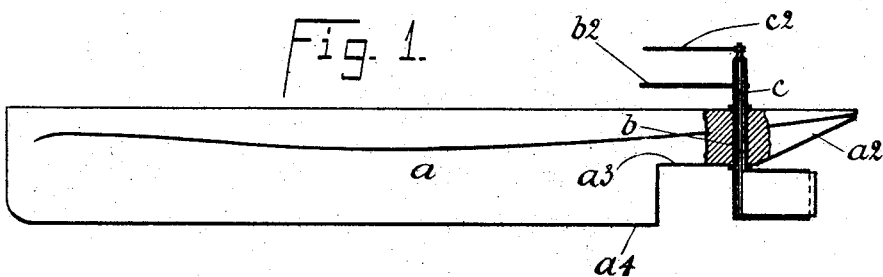

No. 765,171. PATENTED JULY 19, 1904.
C. VOGEL, DEC'D.
E. EBERT, ADMINISTRATRIX.
STEERING AND PROPELLING DEVICE FOR VESSELS.
APPLICATION FILED FEB. 18, 1904.
NO MODEL. 2 SHEETS—SHEET 1.

WITNESSES
A. B. Mattingly
F. A. Stewart

INVENTOR
Carl Vogel, dec'd.
Ernestiene Ebert
ADMINISTRATRIX
PER Edgar Tate Co. ATTORNEYS No. 765,171. PATENTED JULY 19, 1904.
C. VOGEL, DEC'D.
E. EBERT, ADMINISTRATRIX.
STEERING AND PROPELLING DEVICE FOR VESSELS.
APPLICATION FILED FEB. 18, 1904.
NO MODEL. 2 SHEETS—SHEET 2.
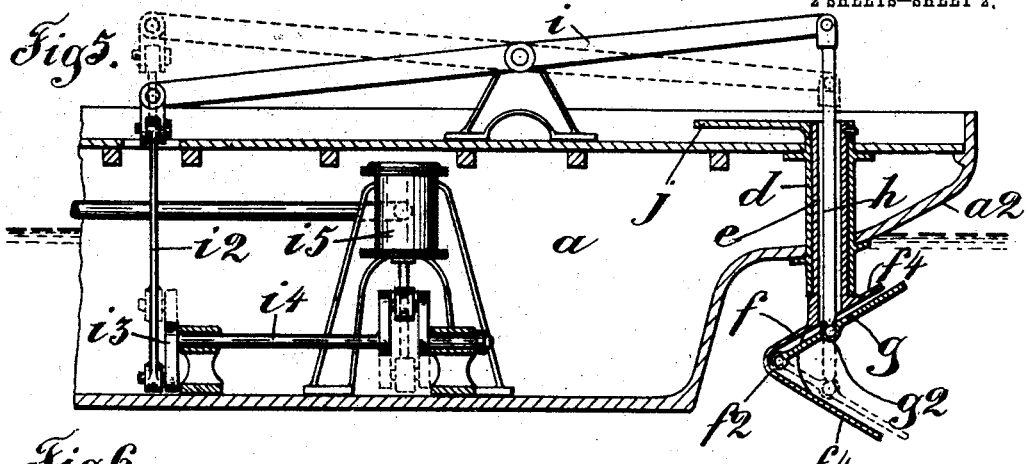
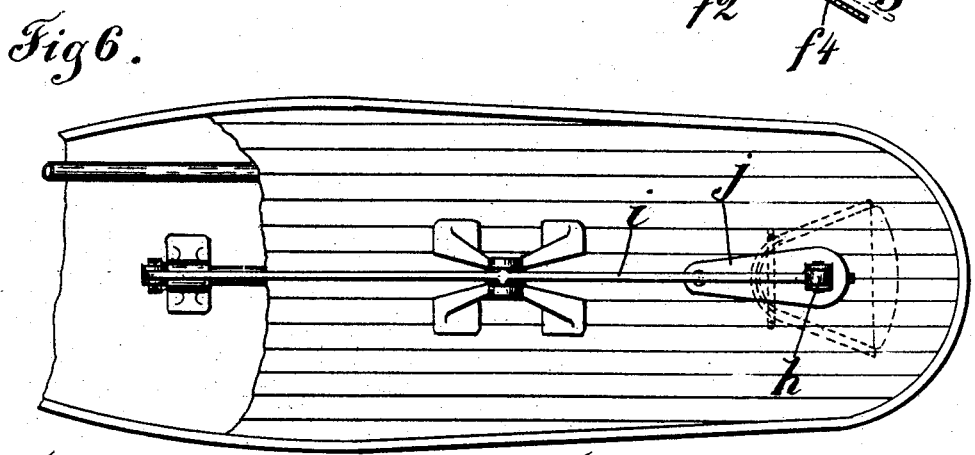
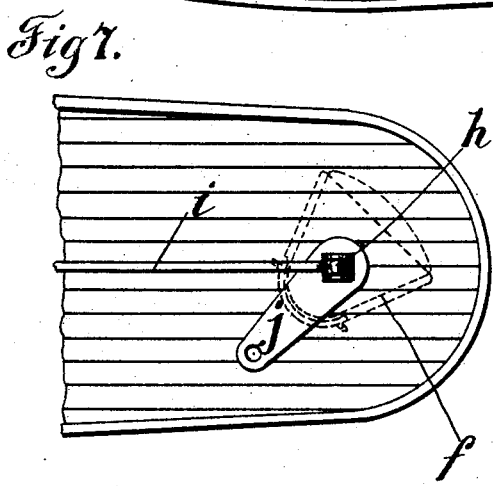
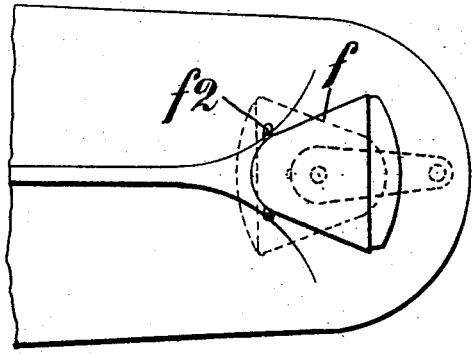
WITNESSES
A. B. Mattingly
F. A. Stewart
INVENTOR
Carl Vogel, dec'd.
Ernestiene Ebert
ADMINISTRATRIX
PER Edgar Tate & Co.
ATTORNEYS No. 765,171.

Patented July 19, 1904.

UNITED STATES PATENT OFFICE.

ERNESTIENE EBERT, OF BROOKLYN, NEW YORK, ADMINISTRATRIX OF CARL VOGEL, DECEASED.

STEERING AND PROPELLING DEVICE FOR VESSELS.

SPECIFICATION forming part of Letters Patent No. 765,171, dated July 19, 1904.

Application filed February 18, 1904. Serial No. 194,162. (No model.)

*To all whom it may concern:*

Be it known that I, ERNESTIENE EBERT, a citizen of the United States, residing at Brooklyn, in the county of Kings and State of New York, am in possession of, and hereby make application for a patent on, an Improvement in Steering and Propelling Devices for Vessels, said improvement being the invention of CARL VOGEL, deceased, of which the following is a specification, such as will enable those skilled in the art to which it appertains to make and use the same.

The object of this invention is to provide an improved combination propelling and steering device for boats and vessels of various kinds and classes; and with this and other objects in view the invention consists in a propelling and steering device for vessels constructed as hereinafter described and claimed.

The invention is fully disclosed in the following specification, of which the accompanying drawings form a part, in which the separate parts of the improvement are designated by suitable reference characters in each of the views, and in which—

Figure 2:
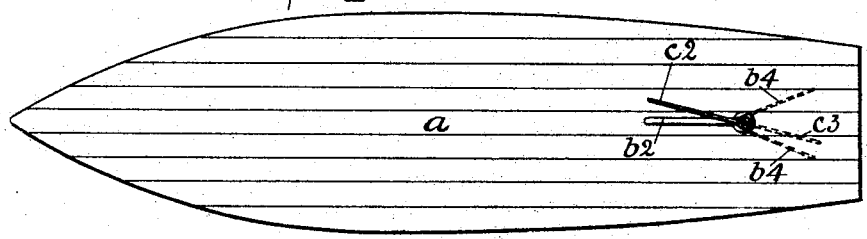
Figure 3:
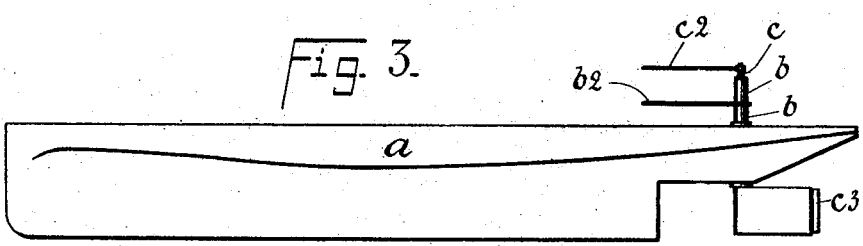
Figure 4:
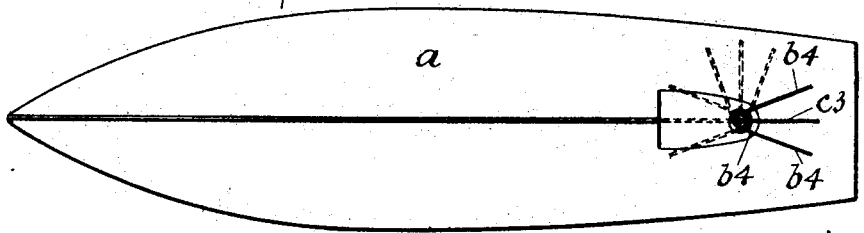

Figure 1 is a sectional side view of a boat provided with the improved combination steering and propelling device; Fig. 2, a plan view thereof; Fig. 3, a side view; Fig. 4, a bottom plan view; Fig. 5, a sectional side view showing a modification; Fig. 6, a plan view of the construction shown in Fig. 5; Fig. 7, a view similar to Fig. 6, but showing the parts in a different position; and Fig. 8, a bottom plan view.

In the drawings forming part of this specification, reference being made to Figs. 1 to 4, inclusive, is shown at $a$ the hull of a boat or vessel having an overhanging stern portion $a^2$, the bottom part of which is flat or horizontal, as shown at $a^3$, and below the flat or horizontal bottom part $a^3$ of the overhanging stern portion $a^2$ the keel portion of the hull projects, as shown at $a^4$.

Passed vertically through the overhanging portion $a^2$ and supported therein in any desired manner is a tubular shaft $b$, with the upper portion of which is connected above the deck of the vessel an arm, lever, or other suitable operating device $b^2$, whereby the tubular shaft $b$ may be turned, and connected with the lower end of the tubular shaft $b$ below the overhanging portion $a^2$ of the stern of the vessel is a V-shaped steering device consisting of separate blades $b^4$.

Passing vertically through the tubular shaft $b$ is another shaft, $c$, with the upper end of which is connected an arm, crank, lever, or any other suitable device $c^2$, and connected with the lower end of the shaft $c$ and projecting between the separate side members or blades $b^4$ of the steering device $b^3$ is a propeller-blade $c^3$.

When the parts are in the position shown in Figs. 1 and 2, if the shaft $c$ be oscillated rapidly in opposite directions the propeller-blade $c^3$ will be swung rapidly between the side members $c^4$ of the steering device and the water will be forced by the inclined surfaces of the blades or members $b^4$ of the steering device and the movement of the propeller-blade $c^3$ backwardly with great force, and this movement of the water will force the vessel forward, as will be readily understood.

If the shaft $b$ be turned around so that the propeller $b^3$ will project in the forward direction and the shaft $c$ be rapidly oscillated, as above described, the result will be to force the vessel backwardly, and if the shaft $b$ be turned so that the steering-blades $b^4$ project to one side and the shaft $c$ be rapidly oscillated, as hereinbefore described, the result will be to turn the vessel in either direction according to the direction in which the steering device or the blades $b^4$ thereof are turned.

In Fig. 4 of the drawings three different positions of the propeller and steerer are shown, and it will be apparent that in this way a vessel may be guided in any desired direction, may be propelled, or backed, or turned around whenever desired.

Any suitable means may be provided for turning the shaft $b$ and oscillating the shaft $c$, and it will be understood that both of these operations may be performed by various kinds of power devices or mechanism located in the vessel or on the deck thereof.

In Figs. 5 to 8, inclusive, is shown a modification of this invention in which the hull $a$ is provided with an overhanging portion $a^2$ at the stern thereof, the same as in Figs. 1 to 4, inclusive, and passed vertically through this overhanging portion is a sleeve $d$, which is secured therein in any desired manner, and passed through this sleeve $d$ is a tubular shaft $e$, provided at its lower end with a V-shaped member $f$, in the apex of which is pivoted, as shown at $f^2$, a propeller-blade $g$, and the V-shaped member $f$ is provided with top and bottom blades $f^4$, which are separated by an angle of about forty-five degrees. Pivoted or hinged to the propeller-blade $g$ at $g^2$ and in any desired manner is a shaft or rod $h$, which passes upwardly through the tubular shaft $e$, and in the form of construction shown a walking-beam $i$ is pivoted to the upper end of the shaft or rod $h$ and extends longitudinally of the hull $a$ and may be operated by a crank-rod $i^2$, with which is connected a crank $i^3$, secured to a crank-shaft $i^4$, operated by a steam-cylinder $i^5$ or in any desired manner.

In the form of construction shown the upper end of the tubular shaft $e$ is provided with a crank or arm $j$, and by means of this crank or arm the tubular shaft $e$ may be turned in the sleeve $d$, as will be readily understood.

When the parts are in the position shown in Fig. 5, the vertical movement of the shaft or rod $h$ will force the water out of the V-shaped member $f$ backwardly and the vessel will be propelled forwardly, this operation being the same as the operation of the construction shown in Figs. 1 to 4, and by turning the tubular shaft $e$ the V-shaped member $f$ may also be turned to any desired angle, while the shaft or rod $h$ is operated as above described, and by this means the vessel may be steered or guided in any desired direction, and by turning the V-shaped member $f$ entirely around, as shown in Fig. 8, the vessel may be backed, as will be readily understood.

The invention is not limited to the means herein shown and described for operating the tubular shaft $e$ or the shaft or rod $h$, and any suitable means or devices may be provided for this purpose, and, if desired, the top and bottom blades or plates $f^4$ may be connected at the sides, so as to inclose the space between said blades or plates or partially inclose the same, and this is also true with the construction shown in Figs. 1 to 4, inclusive. As thus constructed it will be seen that the tubular shaft $e$ constitutes the steering-shaft and the shaft or rod $h$ the propelling-shaft, while in Figs. 1 to 4, inclusive, the shaft $b$ constitutes the steering-shaft and the shaft or rod $c$ the propelling-shaft.

It will also be seen that in Figs. 1 to 4, inclusive, the blades or plates $b^4$ are arranged vertically and the propelling-blade $b^2$ moves horizontally, whereas in Figs. 5 to 8, inclusive, the blades or plates $f^4$ are arranged horizontally, while the propelling-blade $g$ moves vertically.

Having fully described the invention, what is claimed as new, and desired to be secured by Letters Patent, is—

1. A vessel provided with a tubular steering-shaft mounted vertically in the stern thereof and provided at its lower end with a V-shaped device comprising separate side plates, means for turning said shaft, another shaft passing vertically through said first-named shaft and provided at its lower end with a propeller-blade between the separate blade members of the steering device, and means for operating the last-named shaft, substantially as shown and described.

2. A vessel provided with a tubular steering-shaft mounted vertically in the stern portion thereof and provided at its lower end with a V-shaped steering device composed of separate side plates, a propeller-shaft passing vertically through the steering-shaft and provided at its lower end with a blade located between the side plates of the V-shaped steering device, means for operating the steering-shaft, and devices for operating the propeller-shaft, substantially as shown and described.

In testimony that I claim the foregoing as the invention of the said CARL VOGEL I have signed my name, in the presence of the subscribing witnesses, this 15th day of February, 1904.

ERNESTIENE EBERT,
*Administratrix of the estate of Carl Vogel, deceased.*

Witnesses:
WILLIAM TRIMBORN,
WILLIAM F. GILLICK.